(12) United States Patent
Rastas et al.

(10) Patent No.: US 6,274,104 B1
(45) Date of Patent: Aug. 14, 2001

(54) NON-FERROUS METAL RECOVERY METHOD UTILIZING A MELT SULPHATION REACTION

(76) Inventors: Jussi Rastas, Bredantie 8 D 19, Fin-02700 Kauniainen; Pekka Saikkonen, Pajamäentie 3 A 6, Fin-00360 Helsinki, both of (FI)

( * ) Notice: Subject to any disclaimer, the term of this patent is extended or adjusted under 35 U.S.C. 154(b) by 0 days.

(21) Appl. No.: 09/325,197

(22) Filed: Jun. 3, 1999

(30) Foreign Application Priority Data

Jun. 4, 1998 (FI) .......................................... 981279

(51) Int. Cl.[7] ........................ C22B 15/00; C22B 47/00; C22B 19/00; C22B 23/00
(52) U.S. Cl. ............................ 423/24; 423/37; 423/42; 423/49; 423/50; 423/99; 423/100; 423/101; 423/104; 423/138; 423/139; 423/146; 423/147; 75/419; 75/424; 75/425; 75/429; 75/430; 75/431
(58) Field of Search ...................... 423/138, 139, 423/146, 147, 37, 24, 42, 101, 104, 50, 49, 99, 100; 75/419, 424, 425, 429, 430, 431

(56) References Cited

U.S. PATENT DOCUMENTS 4,272,493   6/1981   Subramanian .
4,464,344   8/1984   Saikkonen .
5,082,638   1/1992   Saikkonen et al. .

FOREIGN PATENT DOCUMENTS

81/01420   5/1981   (WO) .
89/09289   10/1989   (WO) .

*Primary Examiner*—Steven Bos
(74) *Attorney, Agent, or Firm*—Andrus, Sceales, Starke & Sawall, LLP

(57) ABSTRACT

The invention relates to a method for recovering non-ferrous metals, particularly nickel, cobalt, copper, zinc, manganese and magnesium, from materials containing said metals by converting said non-ferrous metals into sulphates by means of melt and melt coating sulphation, i.e. by a thermal treatment under oxidizing conditions within a temperature range of 400 to 800° C., during which a reaction mixture is formed containing at least one said non-ferrous metal, iron(III)sulphate and alkali metal sulphate, and appropriate reaction conditions are selected to substantially prevent iron(III)sulphate from thermally decomposing to hematite, and finally, said non-ferrous metals are recovered as metallic compounds. In the method of the invention, a process is formed around the melt and melt coating sulphation, which comprises nine steps. The invention is particularly characterized by the manner of pelletizing the material to be fed into step 2 with an alkali metal (Na, K) sulphate—sulphuric acid—water solution, during which the hematite ($Fe_2O_3$) contained in the feed material will at a suitable temperature react with sulphuric acid and form hydrous iron(III)sulphate which together with sodium sulphate also acts as the bonding agent required in the pelletizing.

12 Claims, 2 Drawing Sheets

Products (1, 2, 4, 6) and residual products (3, 5) of the process

Figure 1:
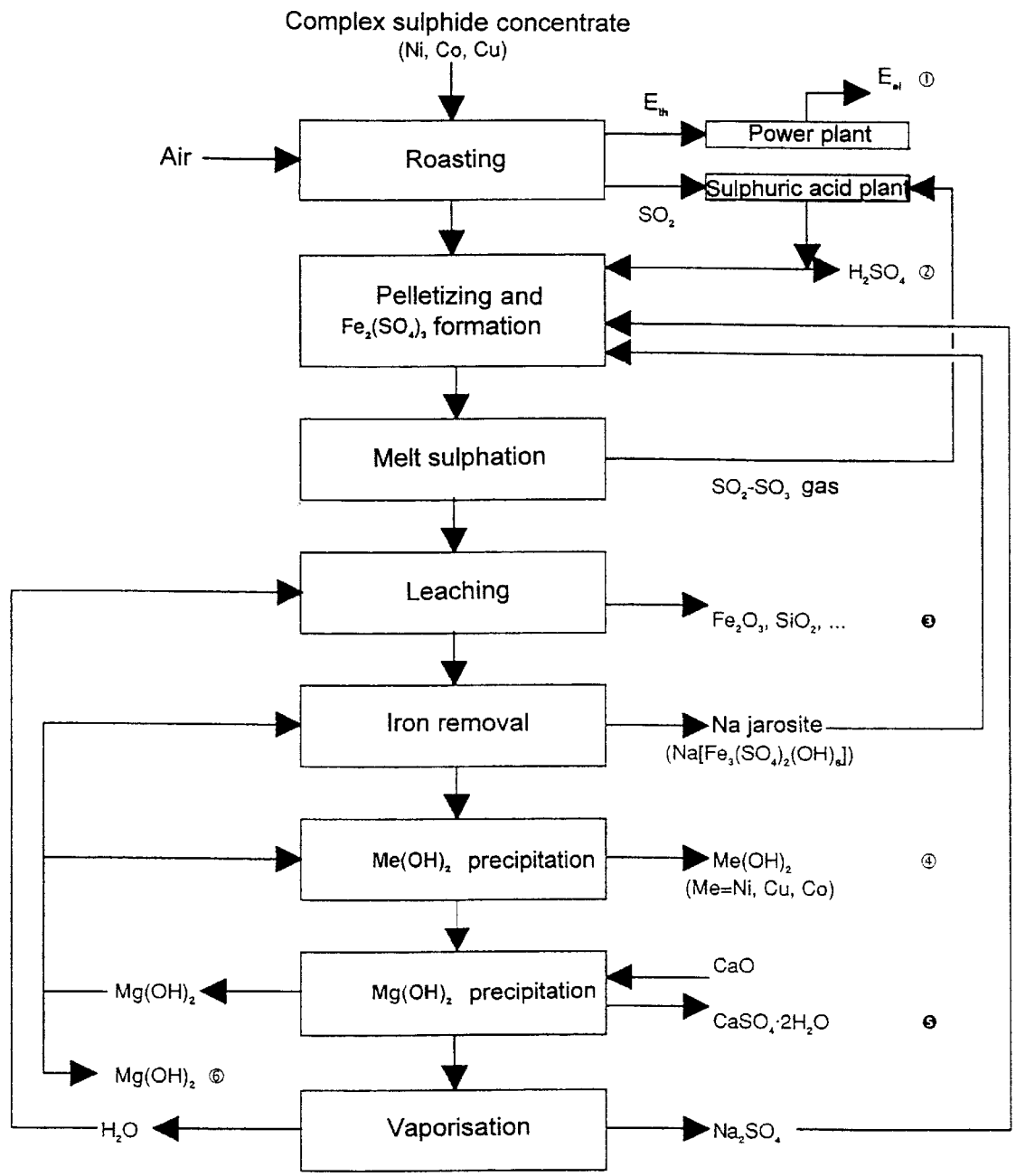

Figure 1    Process chart

Sample: $Fe_2O_3$ (85.862 mg) + $H_2SO_4$ (47 mg)

Heating rate: 10 °C / min        Atmosphere: air

| Reaction No. | Temperature | Weight change | Gas product |
|---|---|---|---|
| S1 | 30–125 °C | 1.3 % | $H_2O$ |
| S2 | 125–190 °C | 8.1 % | $H_2O$ |
| S3 | 190–250 °C | 7.7 % | $H_2O$ |
| S4 | 250–320 °C | 6.1 % | $H_2O$ |
| S5 | 320–550 °C | 0.5 % | |
| S6 | 550–820 °C | 43.6 % | $SO_3$ |

NON-FERROUS METAL RECOVERY METHOD UTILIZING A MELT SULPHATION REACTION

The invention relates to a method for recovering non-ferrous metals, particularly nickel, cobalt, copper, zinc, manganese and magnesium, from materials containing said metals by converting said non-ferrous metals into sulphates by means of melt and melt coating sulphation, i.e. by a thermal treatment under oxidizing conditions within a temperature range of 400 to 800° C., during which a reaction mixture is formed containing at least one said non-ferrous metal, iron(III)sulphate and alkali metal sulphate, and appropriate reaction conditions are selected to substantially prevent iron(III)sulphate from thermally decomposing to hematite, and finally, said non-ferrous metals are recovered as metallic compounds. In the method of the invention, a process is formed around the melt and melt coating sulphation, which comprises the following steps:

a) if necessary, the material is pre-treated to convert it into oxidized and ferritic form for easier treatment with melt and melt coating sulphation, b) after the pre-treatment or in a related step, a sufficient amount of iron(III)sulphate is formed and, if required, the iron compound formed in the process is recycled to this step and further, the alkali metal (Na, K(sodium and/or potassium)) sulphate—water mixture concentrated in the process is recycled to this step, c) the mixture formed during the previous steps and adjusted to a suitable composition now containing iron(III) sulphate and alkali metal (Na, K) sulphate in a sufficient quantity and in due proportion to the amount and composition of the original material, is directed to a melt and melt coating sulphation step in which melt conditions favourable to sulphation are created and maintained long enough to produce as complete sulphation as possible, and, if necessary, a thermal after-treatment is added to this step to decompose the iron(III)sulphate of the sulphate melt into hematite ($Fe_2O_3$) and sulphur trioxide to reduce the amount of water-soluble iron, d) the mixture formed by the sulphate melt and solid phase is lead to a leaching step in which the soluble sulphates dissolve in water; after the leaching step, the non-dissolved solids are separated from the solution, washed and removed from the process, and the washing water is returned to the process, e) if required, the thus formed solution is lead to an iron removal step in which iron(III) is precipitated as alkali metal (Na, K) jarosite, jarosite is separated from the liquid phase, washed, if necessary, and recycled into the process step described in item 2, and the washing water is returned to the process, f) if required, the solution is lead (the original material contains aluminium) to an aluminium removal step in which aluminium is precipitated as hydroxide or alunite, separated from the liquid phase, washed and removed from the process, and the washing water is returned to the process, g) the solution is lead to an Me removal step (Me=Ni, Co, Cu, Zn, Mn), in which the metals, Me, and if required also iron and aluminium, are separated by mixed hydroxide or sulphide precipitation, ion exchange or liquid-liquid-extraction, and the compounds of said metals are removed from the process and reprocessed in a manner known per se into pure metallic compounds or metals, h) the solution is lead to a magnesium removal step in which magnesium is precipitated as hydroxide in a manner known per se, magnesium hydroxide is separated from the liquid phase and reused as a neutralizing agent in the steps described in items 5, 6 and 7, and excess magnesium hydroxide is removed from the process, and i) the solution is lead to an alkali metal (Na, K) sulphate concentration step in which the concentration is performed by evaporation, the concentrated alkali metal (Na, K) sulphate—water mixture is recycled to the step described in item 2, excess alkali metal (Na, K) sulphate is removed from the process and the water evaporated during the concentration step and then re-condensed is mainly directed to the step described in item 4 and to a lesser extent to the steps described in items 5 and 6, particularly to their washing steps.

The method of the invention is characterized in that before the melt and melt coating sulphation step (step 3), the initial mixture is pelletized and iron(III)sulphate is created using a sulphuric acid solution and, if necessary, roasting is performed before this treatment (step 1).

The invention is especially characterized by the manner of pelletizing the material fed into step 2 with an alkali metal (Na, K) sulphate—sulphuric acid—water solution, during which the hematite ($Fe_2O_3$) in the feed material will at a suitable temperature react immediately with sulphuric acid and form hydrous iron(III)sulphate which together with sodium sulphate also acts as a bonding agent required in the pelletizing.

A central feature of the invention is thus a step where oxidic (or silicated) material or material which has undergone an oxidizing treatment is pelletized and a step related hereto, where iron(III)sulphate is formed, and an entire process formed around these steps and the steps preceding them enabling the recovery of for example said metals in an advantageous and technically simple manner.

Finnish Patent 65088 discloses a method which in Finnish Patent 83335 is called melt and melt coating sulphation. Thus, melt coating sulphation refers to a situation in which a molten phase containing a sulphating reagent forms a coating or film around the particles to be sulphated while the mixture containing molten and solid phase behaves mechanically like a pulverised or paste-like material depending on the quantity of melt, as opposed to melt sulphation in which the material is substantially in molten form and contains varying quantities of solid phase. The above-mentioned definitions have no significance as to the chemical reactions in the system. The melt and melt coating sulphation disclosed in Finnish Patent 65088 comprises a method to recover non-ferrous metals from their minerals, mineral concentrates, roasted oxidic intermediates or slags by converting them into sulphates using substantially as the sulphating agent a sulphate mixture comprising alkali metal sulphate, iron(III)sulphate and sulphates of one or more desired non-ferrous metals. In the referred method, the reagent used in sulphation is substantially an iron(III) sulphate contained in the reaction mixture, and the method uses a temperature range in which this reagent, $Fe_2(SO_4)_3$, stays substantially stable in the molten sulphate phase. Generally, when applying melt or melt coating sulphation, the important part is the sulphation of oxides or, as often is the case in practice, ferrites ($MeFe_2O_4$ in which Me=Ni, Co, Cu, Zn, . . . ) contained in the processed oxidic material or material which has undergone an oxidizing treatment, using a ferric sulphate, $Fe_2(SO_4)_3$, in sulphate melt in accordance with the reaction described in the main claim of patent 65088 or correspondingly the reaction (1).

$$3MeFe_2O_4(s)+Fe_2(SO_4)_3(melt)\rightarrow 3MeSO_4(melt)+Fe_2O_3(s) \qquad (1)$$

The particular mechanism and kinetics of the reaction between the Me ferrites and the sulphate melt are described in the article: P. J. Saikkonen, J. K. Rastas, The Role of Sulfate Melts in Sulfating Roasting, 25th Annual Conference of Metallurgists, Proceedings Nickel Metallurgy, Ed. E. Ozberk and S. W. Macuson, Series 25-7/6/1/3, No. 3 (Vol. 1) (1986) 278–290.

The thorough-sulphation of the ferrite particles, $MeFe_2O_4$, occurs in a counter-diffusion during which the $Me^{2+}$ ion moves through a growing $Fe_2O_3$ phase formed between the ferrite phase and sulphate melt phase to the sulphate melt, and the $Fe^{3+}$ ion moves from the sulphate melt through the hematite ($Fe_2O_3$) phase in the opposite direction, and the entire occurrence can be presented in general with the reaction equation (2),

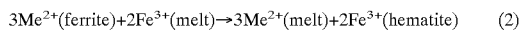

$$3Me^{2+}(ferrite)+2Fe^{3+}(melt) \rightarrow 3Me^{2+}(melt)+2Fe^{3+}(hematite) \qquad (2)$$

The thorough-sulphation of the ferrite particles is a relatively rapid process. The thorough-sulphation of ferrite particles having a diameter of a few dozen micrometers can be implemented with melt sulphation at a temperature of 700° C. in approximately 10 to 20 minutes.

It is to be particularly noted that the implementation of melt and melt coating sulphation as a reaction between a solid phase and a melt phase does not require a gaseous phase as a component participating in the reaction, as happens in conventional sulphating roasting, but the gas atmosphere, which is small in quantity in relation to the solid and melt phases, in a melt or melt coating sulphate reactors with its adjustable $SO_3$ content only serves to stabilise the sulphate melt, i.e. stops its thermal decomposition.

When performing sulphation with melt or melt coating sulphation, i.e. with the method described in Finnish Patent 65088, it is particularly important to make sure that the quantity of iron(III)sulphate in the reaction mixture is sufficient to produce a complete conversion with respect to the desired ferrite(s) according to the reaction (1) or (2). In this sense, it is detrimental to allow the iron(III)sulphate in the reaction mixture to unnecessarily decompose before all metal values, Me, are in sulphate form. The quantity of iron(III)sulphate in the reaction mixture must be optimized by the selection of temperature and partial pressure of $SO_3$ in the surrounding atmosphere in a known and controlled manner so as to make sure that, when necessary, there is enough iron(III)sulphate available in the sulphate melt in accordance with the reaction (1) (or (2)).

Finnish Patent 65088 examines prior art in the field of conventional sulphating roasting, to which description of prior art attention is also paid in Finnish Patent 83335. Conventional sulphating roasting comprises disadvantages which have, in practice, prevented its application on a larger scale than at present. It is known that the sulphation of particularly nickel compounds (for instance pentlandite) is difficult to perform, because in a sulphation performed via a gaseous phase, the compact sulphate shell formed on the surface of the particles effectively prevents further sulphation. As a result of this, sulphating roasting is not generally used in processing nickel raw materials. It is only with the melt or melt coating sulphation described in Finnish Patent 65088 that an improvement can be achieved in this respect.

It is, however, generally necessary for the sulphation of typical nickel and cobalt raw materials that the reaction mixture contains a considerable amount of sulphate melt. This requires the use of fairly large amounts of alkali metal and iron(III)sulphate and generates thus considerable processing costs. Finnish Patent 83335 discloses a solution enabling, if necessary, the use of largish amounts of sulphate melt in the melt and melt coating sulphation step, but preventing the considerable processing costs involved in the use of large amounts of alkali metal and iron(III)sulphate.

In the solution of Finnish Patent 83335, a whole process entity has been created around the melt and melt coating sulphation step, which enables the recovery of metal values in an advantageous manner. The process comprises the following steps:

1. A pre-treatment step to convert the material to be sulphated to an oxidic or ferritic form that can be easily processed by melt and melt coating sulphation.

2. Efficient formation of iron(III)sulphate by a proper selection of roasting conditions for the reaction mixture in this respect and recycling and addition of iron(III)sulphate.

3. Creation and maintenance of melt conditions advantageous for sulphation to produce an as complete sulphation (melt and melt coating sulphation) as possible, and a thermal after-treatment associated with it, if necessary, as disclosed in Finnish Patent 65088, in which treatment the iron(III) sulphate of the sulphate melt is decomposed into hematite ($Fe_2O_3$) to reduce the quantity of water-soluble iron and thus also the costs of the iron precipitation (step 5).

4. A leaching step, in which the sulphate phase formed by melt and melt coating sulphation is dissolved in water, and a separation of solids and solution and washing of solids associated with this step.

5. An iron removal step: precipitation of iron as jarosite and recycling the iron to the steps 1 and/or 2.

6. An aluminium removal step (if aluminium is included in the feed material): aluminium is precipitated as hydroxide or alunite.

7. A step for removing metal values (Me): fractional or mixed hydroxide or sulphide precipitation, ion exchange or liquid-liquid extraction.

8. A magnesium removal step: magnesium is precipitated as hydroxide using lime as a neutralizing agent. The step also includes a separation step of magnesium hydroxide and the formed gypsum.

9. An alkali metal sulphate separation step: the concentration of the solution and separation of salts is performed with for instance evaporative crystallisation and alkali metal sulphate is recycled to steps 1 to 3, and any excess alkali metal sulphate (if the feed material contains alkali metal compounds) is removed from the cycle. Condensed water is recycled to step 4. FIG. 1 of Finnish Patent 83335 shows the steps of the process in a case where Me separation is implemented by mixed hydroxide precipitation.

The invention described in this patent application brings about an essential simplification to the solution presented by Finnish Patent 83335. The solution focuses particularly on step 2 before the actual melt and/or melt coating sulphation step (step 3 above). It is important for an advantageous execution of the sulphation step (step 3) that the material entering this step contains a mixture of $Na_2SO_4$—$Fe_2(SO_4)_3$ in correct proportion to the oxidic and ferritic content and quantity of the feed material and evenly distributed in it. The invention is further characterized in that the correct $Fe_2(SO_4)_3$ quantity required by melt sulphation can be formed easily and in a simple way and that the material entering the melt and/or melt coating sulphation step can at this step be treated in an easily implemented and advantageous way with respect to process engineering.

FIG. 1 shows a process chart illustrating the invention; the chart shows a process variant in which the original material is a complex sulphide concentrate, and the non-ferrous metals that it contains are collectively identified with the symbol Me, where most commonly Me=Ni, Co, Cu.

The complex sulphide concentrate is roasted, usually either in a fluidized bed reactor or a circulating bed reactor.

The energy flow related to the roasting is utilised in a power plant and the lower energy content in the internal cycle of a plant in a conventional way. From the roasting step, the gas containing sulphur dioxide is lead to a process in a sulphuric acid plant, where sulphuric acid is produced from it.

If the original material contains fine-grained metal phase (for instance metal powder or scissel), this can be oxidized in a corresponding way.

The roasted ore is cooled down to a temperature range of 70 to 150° C. and the energy flow related to the cooling is used within the plant in a corresponding way as when gases are cooled. The cooled roasted ore is lead to a pelletizing and $Fe_2(SO_4)_3$ formation step. The roasted ore is pelletized with a $Na_2SO_4$—$H_2SO_4$—$H_2O$ solution. From the last step of the process, the vaporisation step in which the $Na_2SO_4$ solution is concentrated, the $Na_2SO_4$ mixture containing a quantity of water suitable for pelletizing is returned to the pelletizing step. A suitable quantity of sulphuric acid is fed to the sodium sulphate mixture to form a sufficient quantity of iron(III)sulphate (reactions (1) to (3)). The quantity of water in the mixture is preferably also adjusted with respect to the sodium sulphate and sulphuric acid quantities to make sodium sulphate dissolve completely into the solution. A raise in temperature promotes the dissolution. The roasted ore is pelletized with a $Na_2SO_4$—$H_2SO_4$—$H_2O$ solution and the temperature of the pelletizing step is set to a range of 100 to 200° C., preferably to a temperature range of 120–160° C. Pelletizing is preferably carried out in a pelletizing drum or any other typical pelletizing apparatus. In the pelletizing step, sulphuric acid reacts immediately with the hematite in the roasted ore already at approximately 100° C. according to the reaction equation (3)

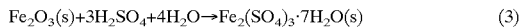

$$Fe_2O_3(s)+3H_2SO_4+4H_2O \rightarrow Fe_2(SO_4)_3 \cdot 7H_2O(s) \qquad (3)$$

and forms hydrous ferric sulphate. This and sodium sulphate form together the bonding agent required in the pelletizing, which makes the pellets homogeneous, compact and mechanically strong enough to endure the later treatment. All above-mentioned properties are particularly necessary for the performance of the melt sulphation which is the next step.

Figure 2:
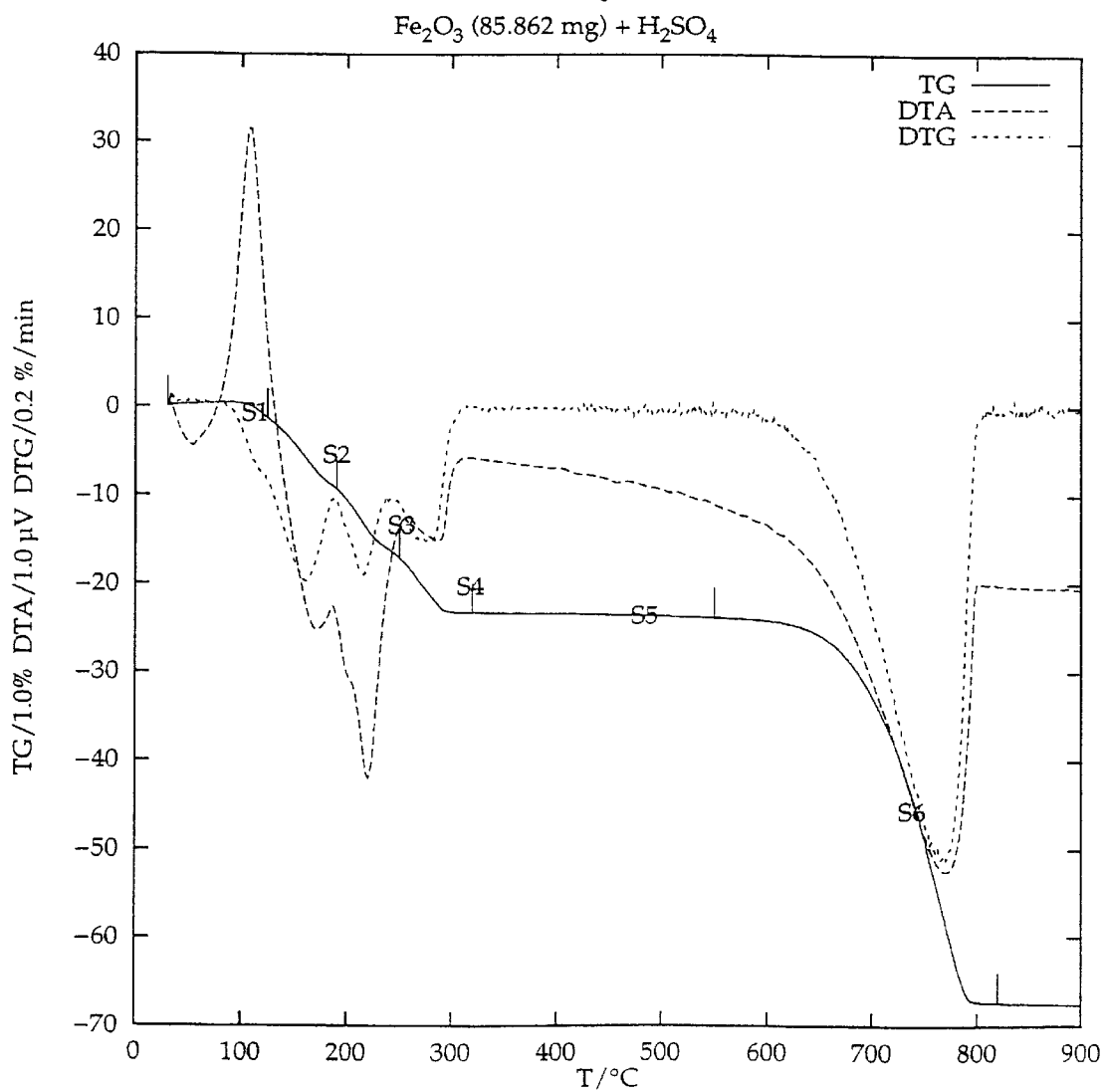

The formation of ferric sulphate is clearly shown in the thermograms in FIG. 2. In the test shown in FIG. 2, sulphuric acid (47 mg) has been added to hematite ($Fe_2O_3$, 85.9 mg). The monitoring of the TG, DTA and DTG values of the sample was started immediately after sulphuric acid was added. At a temperature of approximately 100° C., the DTA curve shows a strong exothermic jump while the weight (TG) curve still remains constant. Hydrous ferric sulphate is formed in this temperature range. The thermograms show that within a temperature range of 100–300° C., the crystal waters are gradually released and at temperatures above 300° C., ferric sulphate is in an anhydrous form and begins to decompose thermally—controlled by the $SO_3$ content of the gas atmosphere—at temperatures above 600° C. into hematite ($Fe_2O_3$) and sulphur trioxide which further decomposes to sulphur dioxide and oxygen in accordance with the equilibrium conditions. The thermogram in FIG. 2 also shows that the sulphuric acid used is equivalently bound to hematite and is released from it within a temperature range of 650 to 800° C. (step S 6 in FIG. 2). The released $SO_3$ quantity corresponds to the added quantity of sulphuric acid.

In his way, the sodium sulphate and ferric sulphate quantities required by melt and/or melt coating sulphation can be exactly controlled in a simple and easily implemented way. This method, which is described in detail in the examples, brings about an essential improvement to the method disclosed in Finnish Patent 83335, because the pelletized material is now in a homogeneous form with a correct mixture of ingredients, and as pelletized it is easy to process.

In case there are iron compounds, such as ferrous sulphate monohydrate or monohydrate with sulphuric acid, available (for instance as industrial waste), these can be used as partial feed material in step 2 to form ferric sulphate ($FeSO_4 + 3/2 O_2 \rightarrow 1/3 Fe(SO_4)_3 + 1/6 Fe_2O_3$; $FeSO_4 + 1/4 O_2 + 1/2 H_2SO_4 \rightarrow 1/2 Fe_2(SO_4)_3$) in oxidizing conditions and within a suitable temperature range.

If the material to be sulphated is a silicate slag (for instance fayalite slag), the pre-treatment comprises in this case a treatment decomposing the silicate phase structure with concentrated sulphuric acid within a temperature range of 100 to 300° C. and the ferrous sulphate produced will later react in oxidizing conditions as described above and form ferric sulphate.

In the process chart shown in FIG. 1, the pelletizing and $Fe_2(SO_4)_3$ formation step is followed by a melt sulphation step. The mixture formed and made into a suitable composition as described above, which now contains iron(III) sulphate and alkali metal (Na, K) sulphate in a sufficient quantity and in due proportion to the amount and composition of the original material, is now directed to a melt and melt coating sulphation step in which favourable melt conditions are created and maintained long enough to produce as complete sulphation as possible, and, if necessary, a thermal after-treatment is added to this step to decompose the iron(III)sulphate of the sulphate melt into hematite ($Fe_2O_3$) and sulphur trioxide to reduce the amount of water-soluble iron and thus also the need for neutralization. This can be achieved either by lowering the $SO_3$ content of the gaseous phase and/or by raising the temperature in the second section of the melt and melt coating sulphation reactor or in a separate reactor.

The sulphation of pelletized material is preferably carried out in a rotary kiln reactor, but other types of reactors are possible.

From the melt sulphation step, the sulphated product comprising the sulphatic and oxidic phase is lead to the leaching step in which the phase comprising soluble sulphates dissolves in water and the oxidic phase containing poorly soluble sulphate (gypsum) remains insoluble. After the leaching step, the insoluble solids are separated from the solution, washed and removed from the process, and the washing water is returned to the process.

The thus formed solution is lead to the iron removal step in which iron(III) is precipitated as alkali metal (Na, K) jarosite, jarosite is separated from the solution phase, washed, if necessary, and recycled to the pelletizing step. The washing water is returned to the process. The magnesium hydroxide that circulates in the process as shown in the process chart in FIG. 1 can be used as a neutralizing reagent for the sulphuric acid produced in the precipitation reaction.

The solution is lead to the $Me(OH)_2$ precipitation step in which metals Me (Me=Ni, Co, Cu, Zn, Mn) are precipitated as hydroxides using the magnesium hydroxide circulating in the process as a precipitation reagent. If the solution contains aluminium and bivalent iron, they, too, are precipitated as hydroxides and bivalent iron oxidizes easily to a trivalent form in the precipitation step. In certain cases, it also is possible to combine the iron removal step to this step to make the iron precipitate as a hydroxide (FeOOH). The mixed hydroxide precipitate is thickened, filtered, washed and removed from the process. The mixed hydroxide is lead to a separate separation and refining step where non-ferrous metals are recovered by conventional means either as pure metal compounds or, in the case of certain metals (Cu, Ni, Co), as pure metals. In this step, the quantities of aluminium and manganese in the precipitate are taken into consideration and removed from the process. If the mixed hydroxide precipitate contains iron hydroxide (FeOOH), the mixed hydroxide precipitate is processed so that iron is returned to the pelletizing step of the process in hydroxide or jarosite form.

After the Me(OH)$_2$ precipitation follows a Mg(OH)$_2$ precipitation step in which magnesium is precipitated as a hydroxide. This step also includes separation of magnesium hydroxide and the gypsum produced as reaction product, if lime is used as a neutralizing agent. Hydrocyclones can be used in this separation. Magnesium hydroxide returns to the steps requiring neutralization in the process. Gypsum and excess magnesium hydroxide are removed from the process.

After the Mg(OH)$_2$ precipitation step, the remaining alkali metal sulphate solution is concentrated by evaporation so that preferably only the quantity of water that is required in the pelletizing step remains in the alkali metal sulphate solution when it proceeds to the pelletizing step. This minimizes the need for evaporation. The water condensed during evaporation is directed to the leaching step of the sulphated product and excess alkali metal sulphate (if the feed material contains alkali metal compounds) is removed from the cycle.

In the following, the invention is described in greater detail with reference to examples.

EXAMPLE 1

A sulphidic nickel concentrate with the following analysis (%):

| Ni | Cu | Co | Fe | S | MgO | CaO | Al$_2$O$_3$ | MnO | SiO |
|---|---|---|---|---|---|---|---|---|---|
| 3.8 | 4.8 | 0.20 | 38.0 | 27.0 | 6.4 | 1.3 | 2.4 | 0.10 | 16.0 | was roasted at a temperature of 900° C. All numerical values in the example refer to 1.000 kg of initial concentrate. The roasting produced 0.916 kg calcine. The calcine was cooled down to 80° C. and pelletized with a Na$_2$SO$_4$—H$_2$SO$_4$—H$_2$O solution at a temperature of 140° C. The solution used for pelletizing contained 250 g Na$_2$SO$_4$, 500 g H$_2$SO$_4$ and 444 g H$_2$O. Additionally, 93.7 g sodium jarosite was fed into the pelletizing step. During pelletizing, 141 g water evaporated. The pellet size was within the range of 3 to 5 mm. 2060 g pelletized material was produced. The pelletized material was fed into the melt sulphate step in which the temperature was 760° C. and the delay time was 70 minutes. The melt sulphation was carried out in a rotary kiln. 1590 g calcine was produced. The calcine was cooled and directed to the leaching step. 2.000 kg water was fed into the leaching step. In the leaching step, 2850 g solution and 748 g solid residue was produced. The composition of the solution was as follows (g/l):

| Na | Mg | Ca | Al | Mn | Cu | Ni | Co | Fe | SO$_4$ |
|---|---|---|---|---|---|---|---|---|---|
| 42.7 | 18.3 | 0.44 | 5.1 | 0.35 | 23.3. | 18.4 | 0.95 | 16.2 | 299 |

The composition of the solid residue was (%):

| Fe | Si | Mg | Ca | Al | Mn | Cu | Ni | Co | SO$_4$ |
|---|---|---|---|---|---|---|---|---|---|
| 50.8 | 10.0 | 0.26 | 1.1 | 0.34 | 0.01 | 0.19 | 0.15 | 0.013 | 2.4 |

The iron in the solution was precipitated as sodium jarosite. 93.7 g jarosite precipitate was produced and 33.8 g magnesium hydroxide was used in the precipitation. Next, the mixed hydroxide precipitation was carried out. 173 g hydroxide precipitate was produced. 115 g magnesium hydroxide was used in the precipitation. The composition of the hydroxide precipitation was (%):

| Cu | Ni | Co | Al | Mn |
|---|---|---|---|---|
| 26.9 | 21.3 | 1.1 | 5.9 | 0.4 |

After the hydroxide precipitation, there was 2740 g solution with the following concentrations (g/l):

| Na | Mg | SO$_4$ |
|---|---|---|
| 40.5 | 49.3 | 280 |

Magnesium was precipitated from the solution by precipitating it as magnesium hydroxide using calcium hydroxide as a neutralizing agent. 301 g calcium hydroxide was used in the neutralization and 237 g magnesium hydroxide was produced. After the magnesium hydroxide precipitation, 2250 g sodium sulphate solution remained with the following concentrations (g/l):

| Na | SO$_4$ |
|---|---|
| 40.5 | 84.5 |

The sodium sulphate solution was concentrated by evaporation. The water quantity to evaporate was 1625 g. After the evaporation, a sodium sulphate mixture remained with the following composition (g/l).

| Na | SO$_4$ |
|---|---|
| 216 | 451 |

The water quantity in the mixture was 375 g.

EXAMPLE 2

A sulphidic nickel concentrate with the following analysis (%):

| Ni | Cu | Co | Fe | S | MgO | CaO | Al$_2$O$_3$ | MnO | SiO |
|---|---|---|---|---|---|---|---|---|---|
| 5.2 | 1.5 | 0.19 | 39.3 | 29.2 | 10.2 | 0.80 | 1.8 | 0.11 | 11.7 | was roasted at a temperature of 950° C. All numerical values in the example refer to 1.000 kg of initial concentrate. The roasting produced 0.895 kg calcine. The calcine was cooled down to 90° C. and pelletized with a $Na_2SO_4$—$H_2SO_4$—$H_2O$ solution at a temperature of 130° C. The solution used for pelletizing contained 250 g $Na_2SO_4$, 500 g $H_2SO_4$ and 445 g $H_2O$. Additionally, 96.9 g sodium jarosite was fed into the pelletizing step. During pelletizing, 142 g water evaporated. The pellet size was within the range of 5 to 8 mm. 2045 g pelletized material was produced. The pelletized material was fed into the melt sulphate step in which the temperature was 770° C. and the delay time was 60 minutes. The melt sulphation was carried out in a rotary kiln. 1607 g calcine was produced. The calcine was cooled and directed to the leaching step. 2.000 kg water was fed into the leaching step. In the leaching step, 2902 g solution and 709 g solid residue was produced. The composition of the solution was as follows (g/l):

| Na | Mg | Ca | Al | Mn | Cu | Ni | Co | Fe | $SO_4$ |
|---|---|---|---|---|---|---|---|---|---|
| 42.8 | 29.2 | 0.44 | 3.8 | 0.38 | 7.3 | 25.2 | 0.90 | 16.7 | 324 |

The composition of the solid residue was (%):

| Fe | Si | Mg | Ca | Al | Mn | Cu | Ni | Co | $SO_4$ |
|---|---|---|---|---|---|---|---|---|---|
| 55.4 | 7.7 | 0.43 | 0.7 | 0.27 | 0.012 | 0.06 | 0.22 | 0.013 | 1.4 |

The iron in the solution was precipitated as sodium jarosite. 96.9 g jarosite precipitate was produced and 35.0 g magnesium hydroxide was used in the precipitation. Next, the mixed hydroxide precipitation was carried out. 136 g hydroxide precipitate was produced. 91 g magnesium hydroxide was used in the precipitation. The composition of the hydroxide precipitate was (%):

| Cu | Ni | Co | Al | Mn |
|---|---|---|---|---|
| 10.7 | 37.2 | 1.3 | 5.6 | 0.6 |

After the hydroxide precipitation, there was 2800 g solution with the following concentrations (g/l):

| Na | Mg | $SO_4$ |
|---|---|---|
| 40.5 | 55.4 | 304 |

Magnesium was precipitated from the solution by precipitating it as magnesium hydroxide using calcium hydroxide as a neutralizing agent. 338 g calcium hydroxide was used in the neutralization and 266 g magnesium hydroxide was produced. After the magnesium hydroxide precipitation, 2250 g sodium sulphate solution remained with the following concentrations (g/l):

| Na | $SO_4$ |
|---|---|
| 40.5 | 84.5 |

The sodium sulphate solution was concentrated by evaporation. The water quantity to evaporate was 1625 g. After the evaporation, a sodium sulphate mixture remained with the following composition (g/l):

| Na | $SO_4$ |
|---|---|
| 216 | 451 |

The water quantity in the mixture was 375 g.

EXAMPLE 3

An oxidic material with the following analysis (%):

| $Na_2O$ | $K_2O$ | MgO | CaO | $Al_2O_3$ | $SiO_2$ | MnO | ZnO | CuO | CoO | S | $Fe_2O_3$ | C |
|---|---|---|---|---|---|---|---|---|---|---|---|---|
| 0.186 | 0.052 | 0.263 | 0.460 | 0.378 | 1.85 | 0.100 | 0.408 | 0.140 | 0.023 | 0.011 | 95.2 | 0.42 | was pelletized with a $Na_2SO_4$—$H_2SO_4$—$H_2O$ solution at a temperature of 130° C. All numerical values in this example refer to 1.000 kg of initial material. The solution used for pelletizing contained 108 g $Na_2SO_4$, 227 g $H_2SO_4$ and 285 g $H_2O$. Additionally, 29 g sodium jarosite was fed into the pelletizing step. During pelletizing, 56 g water evaporated. The pellet size was within the range of 3 to 7 mm. 1660 g pelletized material was produced. The pelletized material was fed into the melt sulphate step in which the temperature was 740° C. and the delay time was 65 minutes. The melt sulphation was carried out in a rotary kiln. 1170 g calcine was produced. The calcine was cooled and directed to the leaching step. 1170 g water was fed into the leaching step. In the leaching step, 1360 g solution and 986 g solid residue was produced. The composition of the solution was as follows (g/l):

| Na | K | Mg | Ca | Al | Mn | Zn | Cu | Co | Fe | SO$_4$ |
|---|---|---|---|---|---|---|---|---|---|---|
| 32.2 | 0.37 | 1.22 | 0.45 | 1.45 | 0.63 | 2.68 | 0.91 | 0.10 | 8.65 | 110 |

The composition of the solid residue was (%):

| Fe | Si | Ca | (ppm) Zn | Cu | Co | Al |
|---|---|---|---|---|---|---|
| 67.8 | 0.87 | 0.28 | 134 | 58 | 54 | 305 |

The solid residue can be used as iron concentrate in iron production. Heavy metals were precipitated from the solution as hydroxides using magnesium hydroxide as a neutralizing agent. 28.8 g hydroxide precipitate was produced and 26.1 g magnesium hydroxide was used in the precipitation. The composition of the hydroxide precipitate was (%):

| Fe | Al | Mn | Zn | Cu | Co |
|---|---|---|---|---|---|
| 35.2 | 5.90 | 2.54 | 10.9 | 3.68 | 0.43 |

After the hydroxide precipitation, 1350 g solution remained with the following concentrations (g/l):

| Na | K | Mg | SO$_4$ |
|---|---|---|---|
| 32.2 | 0.37 | 10.5 | 109.2 |

The hydroxide precipitate was converted with sulphuric acid treatment and 29.2 g sodium jarosite was produced, which was recycled to pelletizing, and 128 g solution with the following concentrations (g/l):

| Na | Al | Mn | Zn | Cu | Co | SO$_4$ |
|---|---|---|---|---|---|---|
| 3.2 | 16.5 | 7.1 | 30.4 | 10.3 | 1.2 | 169 |

The solution can be further processed to recover metal values by conventional means. In the conversion step, 26 g sulphuric acid, 5.1 g sodium sulphate and 103 g water was required. After the hydroxide precipitation, magnesium was precipitated from the solution using calcium hydroxide as a neutralizing agent. 37.6 g calcium hydroxide was used in the neutralization. 29.5 g magnesium hydroxide and 87.4 g gypsum was produced. After the magnesium hydroxide precipitation, 1290 g alkali metal (Na, K) sulphate solution remained with the following concentrations (g/l):

| Na | K | SO$_4$ |
|---|---|---|
| 32.2 | 0.37 | 67.7 |

The alkali metal (Na, K) sulphate solution was concentrated by evaporation. The quantity of water to evaporate was 960 g. An alkali metal (Na, K) sulphate mixture remained with 117 g sodium sulphate, 0.95 g potassium sulphate and 210 g water.

EXAMPLE 4

An oxidic material with the following analysis (%):

| Na$_2$O | K$_2$O | MgO | CaO | Al$_2$O$_3$ | SiO$_2$ | MnO | ZnO | CuO | CoO | PbO | S | Fe$_2$O$_3$ | C |
|---|---|---|---|---|---|---|---|---|---|---|---|---|---|
| 1.25 | 0.86 | 3.05 | 4.43 | 0.91 | 3.13 | 2.62 | 28.1 | 0.038 | 0.001 | 2.32 | 0.17 | 43.2 | 0.45 | was pelletized with a Na$_2$SO$_4$—H$_2$SO$_4$—H$_2$O solution at a temperature of 160° C. All numerical values in this example refer to 1.000 kg of initial material. The solution used for pelletizing contained 200 g Na$_2$SO$_4$, 1300 g H$_2$SO$_4$ and 375 g H$_2$O. Additionally, 18.5 g iron precipitate containing 8.0 g FeOOH was fed into the pelletizing step. During pelletizing, 125 g water evaporated. The pellet size was within the range of 3 to 5 mm. 2790 g pelletized material was produced. The pelletized material was fed into the melt sulphate step in which the temperature was 710° C. and the delay time was 40 minutes. The melt sulphation was carried out in a rotary kiln. 1660 g calcine was produced. The calcine was cooled and directed to the leaching step. 2520 g water was fed into the leaching step. In the leaching step, 3510 g solution and 660 g solid residue was produced. The composition of the solution was as follows (g/l):

| Na | K | Mg | Ca | Al | Mn | Zn | Cu | Co | Fe | SO$_4$ |
|---|---|---|---|---|---|---|---|---|---|---|
| 28.6 | 2.84 | 7.2 | 0.45 | 1.9 | 8.1 | 88.6 | 0.12 | 0.003 | 6.02 | 264 |

The composition of the solid residue was (%):

| Fe | Si | Ca | Pb |
|---|---|---|---|
| 45.8 | 2.3 | 4.8 | 3.3 |

Heavy metals were precipitated from the solution as hydroxides using magnesium hydroxide as a neutralizing agent. 410 g hydroxide precipitate was produced and 260 g magnesium hydroxide was used in the precipitation. The composition of the hydroxide precipitate was (%):

| Fe | Al | Mn | Zn | Cu | Co |
|---|---|---|---|---|---|
| 3.7 | 1.2 | 4.9 | 54.4 | 0.07 | 0.002 |

After the hydroxide precipitation, 3400 g solution remained with the following concentrations (g/l):

| Na | K | Mg | $SO_4$ |
|---|---|---|---|
| 29.6 | 2.8 | 50.3 | 264 |

Hydroxide precipitate is a commercial product. After the hydroxide precipitation, magnesium was precipitated from the solution using calcium hydroxide as a neutralizing agent. 390 g calcium hydroxide was used in the neutralization. 304 g magnesium hydroxide and 900 g gypsum was produced. After the magnesium hydroxide precipitation, 2770 g alkali metal (Na, K) sulphate solution remained with the following concentrations (g/l):

| Na | K | $SO_4$ |
|---|---|---|
| 29.6 | 2.8 | 65.1 |

The alkali metal (Na, K) sulphate solution was concentrated by evaporation. The quantity of water to evaporate was 2270 g. An alkali metal (Na, K) sulphate mixture remained with 229 g sodium sulphate, 16 g potassium sulphate and 250 g water.

EXAMPLE 5

An oxidic material with the following analysis (%):

| $Na_2O$ | $K_2O$ | MgO | CaO | $Al_2O_3$ | $SiO_2$ | MnO | ZnO | CuO | CoO | PbO | S | $Fe_2O_3$ | C |
|---|---|---|---|---|---|---|---|---|---|---|---|---|---|
| 4.41 | 1.67 | 1.92 | 6.48 | 0.76 | 3.31 | 2.26 | 22.7 | 0.19 | 0.001 | 2.46 | 0.44 | 50.2 | 1.6 | was pelletized with a $Na_2SO_4$—$H_2SO_4$—$H_2O$ solution at a temperature of 140° C. All numerical values in this example refer to 1.000 kg of initial material. The solution used for pelletizing contained 142 g $Na_2SO_4$, 1500 g $H_2SO_4$ and 340 g $H_2O$. During pelletizing, 95 g water evaporated. The pellet size was within the range of 4 to 7 mm. 2890 g pelletized material was produced. The pelletized material was fed into the melt sulphate step in which the temperature was 700° C. and the delay time was 60 minutes. The melt sulphation was carried out in a rotary kiln. 1610 g calcine was produced. The calcine was cooled and directed to the leaching step. 2420 g water was fed into the leaching step. In the leaching step, 3260 g solution and 730 g solid residue was produced. The composition of the solution was as follows (g/l):

| Na | K | Mg | Ca | Al | Mn | Zn | Cu | Fe | $SO_4$ |
|---|---|---|---|---|---|---|---|---|---|
| 32.5 | 5.7 | 4.7 | 0.42 | 1.6 | 7.1 | 74.5 | 0.6 | 7.3 | 244 |

The composition of the solid residue was (%):

| Fe | Si | Ca | Pb |
|---|---|---|---|
| 45.6 | 2.1 | 6.3 | 3.1 |

Heavy metals were precipitated from the solution as hydroxides using magnesium hydroxide as a neutralizing agent. 350 g hydroxide precipitate was produced and 220 g magnesium hydroxide was used in the precipitation.

The composition of the hydroxide precipitate was (%):

| Fe | Al | Mn | Zn | Cu |
|---|---|---|---|---|
| 5.1 | 1.1 | 4.9 | 51.9 | 0.4 |

After the hydroxide precipitation, 3400 g solution remained with the following composition (g/l):

| Na | K | Mg | $SO_4$ |
|---|---|---|---|
| 29.9 | 5.3 | 39.4 | 225 |

Hydroxide precipitate is a commercial product. After the hydroxide precipitation, magnesium was precipitated as hydroxide from the solution using sodium hydroxide as a neutralizing agent. 340 g sodium hydroxide was used in the neutralization. 250 g magnesium hydroxide was produced. After the magnesium hydroxide precipitation, 3750 g alkali metal (Na, K) sulphate solution remained with the following concentrations (g/l):

| Na | K | $SO_4$ |
|---|---|---|
| 95.4 | 4.8 | 205 |

The alkali metal (Na, K) sulphate solution was concentrated by evaporation. The quantity of water to evaporate was 2000 g. An alkali metal (Na, K) sulphate mixture remained containing 850 g sodium sulphate, 30 g potassium sulphate and 880 g water.

What is claimed is:
1. A method for recovering non-ferrous metal from an iron-containing material wherein said non-ferrous metals are chemically converted to non-ferrous metal sulphate compounds through a melt sulphation reaction and the non-ferrous metal sulphate compounds are then isolated, said melt sulphation reaction being optimally achieved by providing iron (III) sulphate in a stoichiometrically balanced proportion to the oxidic and ferritic content and quantity of the material processed in the melt sulphation reaction, the method comprising the steps of:

a. reacting the iron-containing material with an alkali metal sulphate, sulphuric acid and water to form a mixture;

b. pelletizing the mixture to form a pelletized product containing a non-ferrous metal, iron (III) sulphate and an alkali metal sulphate;

c. performing the melt sulphation reaction under oxidizing conditions within a temperature range of 400° C. up to 800° C. on the pelletized product, wherein melt sulphation reaction conditions are such to substantially prevent iron (III) sulphate from thermally decomposing to hematite;

d. subsequent to the melt sulphation reaction, leaching the pelletized product with water to form a solution containing dissolved metals of nickel, cobalt, copper, zinc and manganese;

e. removing nickel, cobalt, copper, zinc and manganese from the solution by subjecting the solution to hydroxide or sulphide precipitation or ion exchange or liquid-liquid extraction;

f. precipitating magnesium as magnesium hydroxide from the solution and removing magnesium hydroxide from the solution; and g. concentrating an alkali metal sulphate selected from the group consisting of sodium sulphate and potassium sulphate in the solution by evaporation to provide an alkali metal sulphate mixture to be recycled, and the water evaporated during the evaporation condensed and recycled.

2. A method according to claim 1 wherein the alkali metal sulphate is sodium sulphate.

3. A method according to claim 1 wherein the sulphuric acid is provided as a recycled sulphuric acid generated at a step of the method other than the reacting step.

4. A method according to claim 1 wherein the material is pre-treated by roasting prior to reacting the material in step a. to further optimally promote the melt sulphation.

5. A method according to claim 1 wherein a thermal after-treatment is performed following the melt sulphation reaction of step c. to decompose the iron (III) sulphate into hematite and sulphur trioxide so that amounts of water soluble iron are reduced.

6. A method according to claim 1 wherein a solids fraction is obtained in step d., the solids fraction being washed with water and the washing water returned to the process so that the overall volume of water utilized in the process is conserved.

7. A method according to claim 1 wherein the solution formed in step d. is subjected to an iron removal step following the leaching step, the iron removal step comprising the step of precipitating iron (III) as alkali metal jarosite, the jarosite being separated from the solution and recycled to step b.

8. A method according to claim 1 wherein the material is a silicate slag and the method includes a pretreatment step of decomposing the silicate slag using concentrated sulphuric acid within a temperature range of 1 00° C. to 300° C. prior to step a.

9. A method according to claim 1 wherein the melt sulphation reaction of step c. is carried out in a gas atmosphere which includes sulphur trioxide, the concentration of sulphur trioxide such as to prevent thermal decomposition of the iron (III) sulphate.

10. A method according to claim 9 wherein excess iron (III) sulphate unreacted after the melt sulphation reaction is reduced in amount by chemically converting the unreacted iron (III) sulphate into hematite by lowering the sulphur trioxide content of the gas atmosphere.

11. A method according to claim 1 wherein excess iron (III) sulphate unreacted after the melt sulphation reaction is reduced in amount by raising the final temperature of the melt sulphation reaction to a level to decompose the unreacted iron (III) sulphate.

12. A method according to claim 1 wherein the iron (III) sulphate in the mixture is at least an amount required to stoichiometrically react with the non-ferrous metal (Me) contained in the material according to the chemical reaction $$3\ MeO\ (solid) + Fe_2(SO_4)_3(melt) \rightarrow 3\ MeSO_4(melt) + Fe_2O_3(solid)$$

and a reaction temperature and a reaction partial pressure of sulphur trioxide present in a gaseous atmosphere for the reaction are selected to prevent thermal decomposition of the iron (III) sulphate in the melt sulphation reaction according to the chemical reaction $$Fe_2(SO_4)_3(melt) \rightarrow Fe_2O_3(solid) + 3\ SO_3(gas).$$

* * * * *